(No Model.) 2 Sheets—Sheet 1.
F. W. MORGAN, P. L. CLARK & J. E. PARKER.
VULCANIZER.
No. 577,309. Patented Feb. 16, 1897.
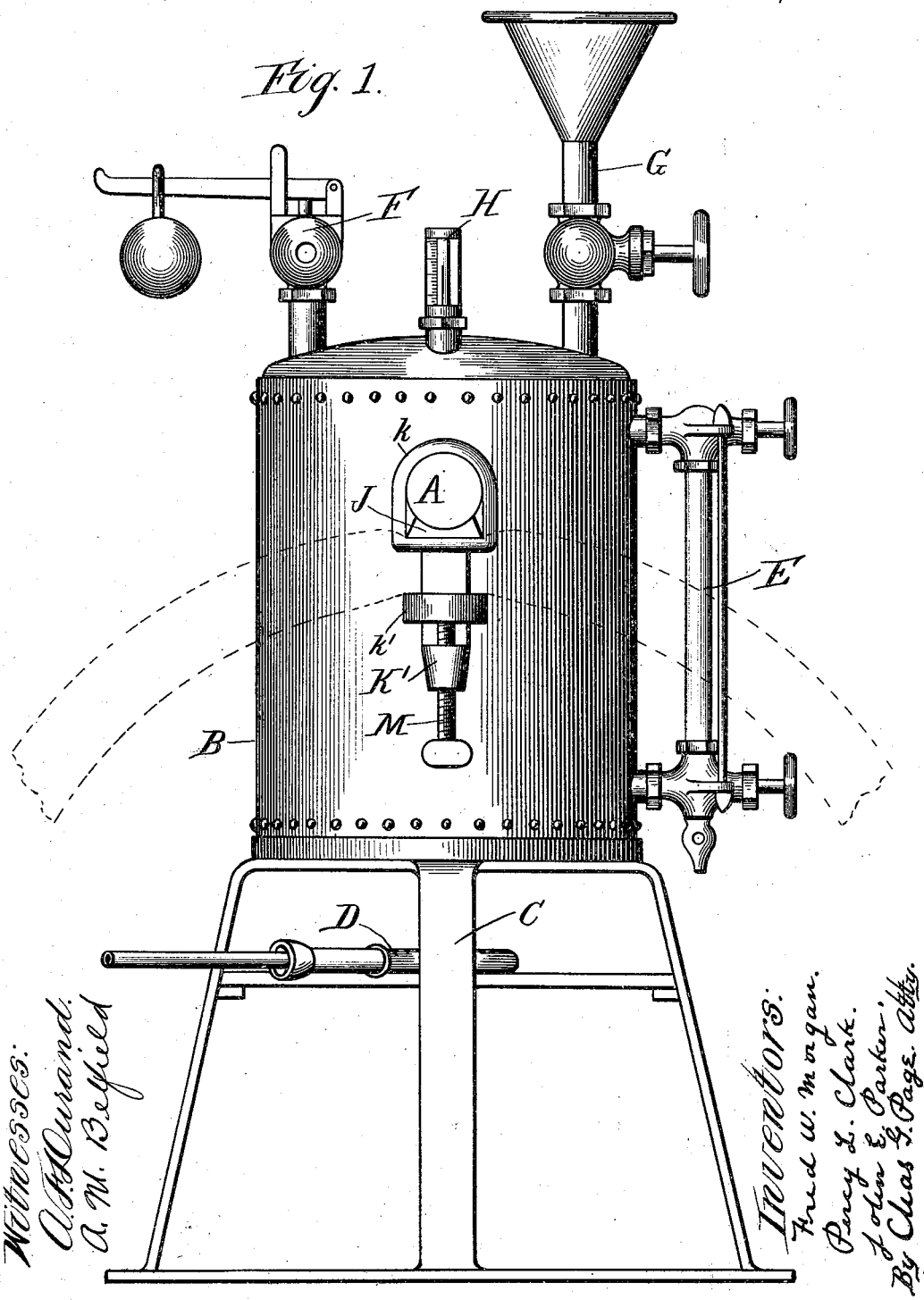

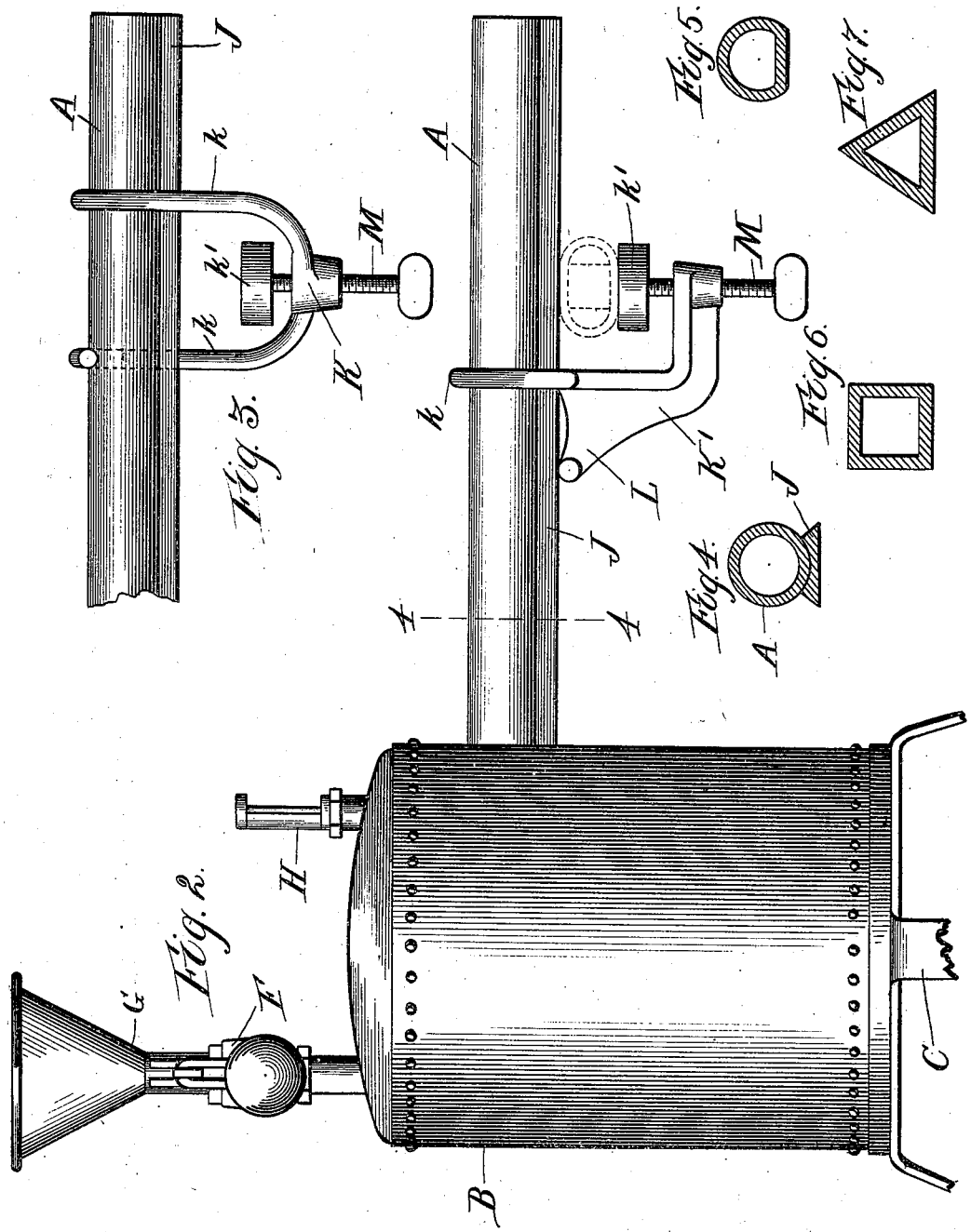

UNITED STATES PATENT OFFICE.

FRED W. MORGAN, PERCY L. CLARK, AND JOHN E. PARKER, OF CHICAGO, ILLINOIS, ASSIGNORS TO SAID MORGAN AND RUFUS WRIGHT, OF SAME PLACE.

VULCANIZER.

SPECIFICATION forming part of Letters Patent No. 577,309, dated February 16, 1897.

Application filed January 31, 1896. Serial No. 577,552. (No model.)

*To all whom it may concern:*

Be it known that we, FRED W. MORGAN, PERCY L. CLARK, and JOHN E. PARKER, citizens of the United States, residing in the city of Chicago, in the county of Cook and State of Illinois, have invented certain new and useful Improvements in Vulcanizers, of which the following is a specification.

Our invention relates to apparatus for vulcanizing rubber, especially small articles or portions of articles of this material.

Prominent objects of our invention are to produce a vulcanizer which may be easily and economically constructed; to make the same light, durable, and perfectly safe, and to provide a construction which is simple and efficient and also particularly adapted to be made in portable form.

A further object of our invention is to produce a vulcanizer specially arranged for vulcanizing or closing a rent or puncture in a pneumatic tire. In thus closing or sealing apertures in rubber articles, such as tires, the aperture is fitted with a patch or plug of a rubber compound which will be vulcanized when heated. In case the opening is too large to be properly closed without additional material then the punctured portion is held in contact with a heated surface until the parts have been vulcanized together and the aperture effectually closed. Hence in a vulcanizer characterized by our invention the vulcanization is brought about by holding the portion of the article to be treated in contact with a heated surface after it has been suitably prepared for such treatment. By such arrangement any part of the article may be vulcanized without subjecting the whole to treatment or without replacing the article in the mold, in case it was molded, and reheating the mold. The work may be done with the smallest amount of labor and with little or no lost heat, and the results are exceedingly satisfactory.

For this purpose our invention consists in arranging a particular part or portion of a vulcanizer so that a surface, desirably metallic, is exposed for contact with the article to be vulcanized, in providing means for heating this contact-surface to the desired temperature, and in providing means for holding the article to be treated in contact with this heated metallic surface.

Our invention further consists in providing for this metallic portion a surface which is particularly adapted for imparting heat to an object brought in contact with it.

Our invention also consists in such other features as are hereinafter set forth.

Referring to the accompanying drawings, Figure 1 is an end elevation of a vulcanizer embodying our invention. Fig. 2 is a side elevation of the upper portion of the same. Fig. 3 is a view showing a modified form of device for holding the article to be vulcanized in contact with the vulcanizing-surface. Fig. 4 is a section on line 4 4 in Fig. 2. Figs. 5, 6, and 7 are sectional views similar to Fig. 4, showing modifications of the features illustrated in said figure.

In carrying out our invention we find a very simple and satisfactory method of providing a readily-heated surface is to arrange a section of pipes so that it will receive steam or other heated vapor which will give it the required temperature. Hence the pipe A is attached to the heater or boiler B in such a way that the steam generated in the latter has free access to and circulates in the pipe. This boiler is conveniently supported on the frame or stand C and is heated by any suitable means, such, for instance, as the gas-burner D. The boiler is desirably provided with the usual water-gage E, safety-valve F, and valved feed-pipe G. The thermometer H is also attached to the boiler, so that the temperature may be regulated to the degree of heat required for vulcanization.

We find it of great advantage to have the surface of the pipe intended for use plane or flat and perfectly smooth, so that the article to be vulcanized may be conveniently held in close contact therewith and receive from it the greatest amount of heat possible. This plane surface may be procured in any suitable way, as, for instance, by brazing a flat strip J, Fig. 4, to a circular pipe A, or by flattening a portion of such a pipe, as in Fig. 5, or by employing a pipe of square or triangular cross-section, as shown in Figs. 6 and 7.

The article to be treated, such, for instance, as the tire shown in dotted lines, Fig. 1, may be held in contact with this flat surface by any suitable device, as the clamp K, Fig. 3, having the hooked hangers $k$ for grasping the pipe and the block or plate $k'$ and thumb-screw M, by which sufficient pressure may be brought to bear to hold said article in place and insure perfect vulcanization. As a matter of further improvement, however, we provide the clamp K, (shown in Fig. 2,) which has but one hanger $k$ for grasping the pipe, but which has in addition an extension or brace L, arranged to come in contact with the pipe a short distance to one side of the point of support of the clamp and on the opposite side of the pipe from such point. By such arrangement pressure may be brought to bear on the article treated, and at the same time space to one side of the hanger is left open for the free manipulation of the same. This is obviously a great advantage in all varieties of work, and is especially so in the handling of circular articles, such as vehicle-tires, as it obviates necessity of removing the clamp in order to place a tire in position or to remove the same when vulcanized.

What we claim as our invention is—

1. The combination, in a vulcanizer having a holder-supporting portion, of a vulcanizing-surface situated below said portion; means for heating said surface; and a detachable holder provided with an adjustable seat arranged opposite said vulcanizing-surface, and with a bearing portion adapted to engage said supporting portion, as set forth.

2. The combination, in a vulcanizer having an arm or extension, of a vulcanizing-surface provided by said arm or extension; means for heating said surface; and a detachable holder provided with an adjustable seat arranged opposite said surface, and with a bearing portion adapted to engage said arm or extension, as set forth.

3. The combination, in a vulcanizer having an arm or extension, of a vulcanizing-surface provided by the latter; means for heating said surface; and a holder provided with an adjustable seat arranged opposite said surface, and with a bearing portion adapted to engage said arm or extension and situated at one side of said seat, whereby the article being vulcanized may be removed and replaced without removing the holder, as set forth.

4. A portable vulcanizer comprising a boiler; a pipe attached to said boiler and provided with a flat vulcanizing-surface; and a detachable clamp arranged to embrace the pipe and provided with screw means for adjusting the article to be vulcanized against the vulcanizing-surface, substantially as described.

5. In a vulcanizer, a clamp for holding an article to be treated in contact with the vulcanizing-surface, said clamp being provided with means of attachment, a brace or extension for contact with said surface at one side of the point of attachment, and means for pressing the article against said surface on the opposite side of said point of attachment, substantially as described.

FRED W. MORGAN.
PERCY L. CLARK.
JOHN E. PARKER.

Witnesses:
ARTHUR F. DURAND,
R. MILLER BELFIELD.